(12) United States Patent
Taniuchi et al.

(10) Patent No.: US 8,249,644 B2
(45) Date of Patent: Aug. 21, 2012

(54) WIRELESS TERMINAL, BASE STATION, WIRELESS COMMUNICATION SYSTEM, AND WIRELESS COMMUNICATION METHOD

(75) Inventors: Kenichi Taniuchi, Kawasaki (JP); Kotaro Ise, Saitama (JP); Yasuro Shobatake, Kawasaki (JP); Takafumi Sakamoto, Tokyo (JP); Nobuhiko Sugasawa, Kawasaki (JP); Keisuke Mera, Kawasaki (JP); Takeshi Ishihara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 459 days.

(21) Appl. No.: 12/625,283

(22) Filed: Nov. 24, 2009

(65) Prior Publication Data

US 2010/0142426 A1    Jun. 10, 2010

(30) Foreign Application Priority Data

Nov. 25, 2008    (JP) .................................. 2008-299938

(51) Int. Cl.
*H04W 88/02* (2009.01)
(52) U.S. Cl. .................... 455/550.1; 455/553.1; 370/338
(58) Field of Classification Search ............... 455/550.1, 455/553.1, 554.2, 556, 574, 561, 67.11, 69, 455/522, 517; 370/331, 338; 342/357.28; 379/106.03
See application file for complete search history.

(56) References Cited

U.S. PATENT DOCUMENTS

| | | | | |
|---|---|---|---|---|
| 6,996,215 | B2 * | 2/2006 | MacConnell | 379/106.03 |
| 7,898,471 | B2 * | 3/2011 | Guo | 342/357.28 |
| 7,899,418 | B2 * | 3/2011 | Ishiyama et al. | 455/127.1 |
| 2004/0114737 | A1 * | 6/2004 | MacConnell | 379/106.03 |
| 2005/0118985 | A1 * | 6/2005 | Takabatake et al. | 455/411 |
| 2006/0128348 | A1 * | 6/2006 | Jang | 455/343.1 |
| 2007/0218859 | A1 * | 9/2007 | Wang | 455/343.1 |
| 2009/0052417 | A1 * | 2/2009 | Sakamoto et al. | 370/338 |
| 2009/0132836 | A1 * | 5/2009 | Mera et al. | 713/310 |
| 2009/0207042 | A1 * | 8/2009 | Park et al. | 340/870.02 |
| 2011/0009155 | A1 * | 1/2011 | Choumaru et al. | 455/522 |

FOREIGN PATENT DOCUMENTS

JP    4081679    2/2008

* cited by examiner

*Primary Examiner* — Kamran Afshar
*Assistant Examiner* — Khawar Iqbal
(74) *Attorney, Agent, or Firm* — Finnegan, Henderson, Farabow, Garrett & Dunner, L.L.P.

(57) ABSTRACT

In a wireless terminal having a wireless transceiver and a wireless receiver which operates with lower power than the wireless transceiver, when the wireless receiver receives, from a base station, a notification message notifying that data addressed to the terminal is existent, the wireless transceiver is turned on to acquire the data.

9 Claims, 14 Drawing Sheets

TABLE

| MAC ADDRESS | Association ID | MODE |
|---|---|---|
| aa.bb.cc.dd.ee.ff | 0x0001 | POWER SAVING |
| ab.cd.ef.11.22.33 | 0x0002 | NORMAL |
| ac.bd.af.44.55.66 | 0x0003 | PS |
| | | |
| | | |
| | | |
| | | |

FIG. 6

Traffic Indication Map (TIM)

| Element ID | Length | DTIM Count | DTIM Period | Partial Virtual Bitmap |
|---|---|---|---|---|

FIG. 7

FRAME FORMAT OF POWER-SAVING RESPONSE

FORMAT OF DATA INCOMING MESSAGE

WIRELESS TERMINAL, BASE STATION, WIRELESS COMMUNICATION SYSTEM, AND WIRELESS COMMUNICATION METHOD

CROSS REFERENCE TO RELATED APPLICATIONS

This application is based upon and claims the benefit of priority from the prior Japanese Patent Application No. 2008-299938, filed on Nov. 25, 2008, the entire contents of which are incorporated herein by reference.

BACKGROUND OF THE INVENTION

1. Field of the Invention

This invention relates to a wireless terminal, a base station, a wireless communication system, and a wireless communication method, and particularly relates to a method for saving power of the wireless terminal.

2. Related Art

A wireless LAN (Local Area Network) terminal has a power save mode (PS mode) for restraining power consumption. In a normal mode, the terminal can perform wireless communication all the time since the power is always turned on to transmit and receive data through the wireless LAN communication. In the PS mode, the terminal turns off the power for the communication when the data to be transmitted is not existent, but periodically turns on the power and receives a beacon from an access point at the intervals of one or a plurality of beacons in order to detect the existence or nonexistence of the data addressed to the terminal. The beacon includes information showing whether the access point has data addressed to the terminal. The terminal detects the information to receive the data. In this way, since small power is required except when receiving the beacon in the PS mode, power consumption in the PS mode is more restrained than in the normal mode (see Japanese Patent No. 4081679).

However, even when the above PS mode is used, the terminal consumes power by periodically turning on the power to receive the beacon regardless of whether or not the access point has the data addressed to the terminal. Accordingly, even when the data to be received is not existent for a long time, the terminal exhausts power if the terminal is not supplied with power.

Japanese Patent No. 4081679 suggests a method in which a power supply signal is used to supply power to the access point and the mobile terminal in a noncontact way so that the power consumed except when performing data communication is reduced. However, since the power supply signal is transmitted within a short distance of several meters, it is difficult to use the method in a telephone service using wireless LAN communication, for example.

SUMMARY OF THE INVENTION

According to an aspect of the present invention, there is provided with a wireless terminal for communicating with a base station, the base station having a base-station-side wireless transceiver which transmits and receives a signal, and the base station having a wireless transmitter which transmits a signal and operates with lower power than the base-station-side wireless transceiver, the wireless terminal comprising: a terminal-side wireless transceiver configured to communicate with the base-station-side wireless transceiver; a first power source configured to supply power to the terminal-side wireless transceiver; a wireless receiver configured to receive the signal transmitted from the wireless transmitter and to operate with lower power than the terminal-side wireless transceiver; a second power source configured to supply power to the wireless receiver; a first controller configured to perform control so that the first power source is turned on and the second power source is turned off in a non-power-saving mode, in which the base-station-side wireless transceiver and the terminal-side wireless transceiver communicates with each other; a second controller configured to perform control so that the first power source is turned off and the second power source is turned on in a power-saving mode, in which the wireless transmitter and the wireless receiver communicates with each other; a switch request frame transmitter configured to transmit, in the non-power-saving mode, a switch request frame for switching a mode to the power-saving mode to the base station through the terminal-side wireless transceiver; a power-saving mode switcher configured to switch the mode to the power-saving mode when the terminal-side wireless transceiver receives, from the base station, a permission frame for permitting the mode to be switched to the power-saving mode; and a communication processor configured to acquire user data from the base station by turning on the first power source and transmitting an acquisition request frame for acquiring the user data through the terminal-side wireless transceiver when in the power-saving mode, the wireless receiver receives a notification frame notifying that the user data addressed to the wireless terminal is existent from the base station.

According to an aspect of the present invention, there is provided with a base station for communicating with a wireless terminal, the wireless terminal having a terminal-side wireless transceiver which transmits and receives a signal and a wireless receiver which receives a signal and operates with lower power than the terminal-side wireless transceiver, the base station comprising: a base-station-side wireless transceiver configured to communicate with the terminal-side wireless transceiver; a wireless transmitter configured to transmit the signal to the wireless receiver and to operate with lower power than the base-station-side wireless transceiver; a switch request frame receiver configured to receiver, in a non-power-saving mode in which the base-station-side wireless transceiver and the terminal-side wireless transceiver communicates with each other, a switch request frame for switching a mode to a power-saving mode in which the wireless transmitter and the wireless receiver communicates with each other, from the wireless terminal through the base-station-side wireless transceiver; a table configured to store an identifier of the wireless terminal which has transmitted the switch request frame; a notification frame transmitter configured to transmit, when user data addressed to the wireless terminal which of identifier is stored in the table is existent, a notification frame notifying that user data addressed to the wireless terminal is existent, through the wireless transmitter; a user data transmitter configured to transmit the user data to the wireless terminal through the base-station-side wireless transceiver when an acquisition request frame of the user data is received from the wireless-terminal through the base-station-side wireless transceiver.

According to an aspect of the present invention, there is provided a wireless communication system and a wireless communication method using the wireless terminal and the base station.

BRIEF DESCRIPTION OF THE DRAWINGS

FIG. 6 is a diagram showing a table controlled by the base station.

FIG. 7 is a diagram showing a Traffic Indication Map (TIM).

DETAILED DESCRIPTION OF THE INVENTION

Embodiments according to the present invention will now be explained with reference to the accompanying drawings.

In the following explanation, a wireless LAN is used to perform wireless data communication. However, the present invention can be applied to the other wireless systems such as WiMAX instead of the wireless LAN.

Further, in the following explanation, the state in which a power saving method of the present invention is performed is called a "power-saving mode," which is distinguished from the "PS mode" of the wireless LAN. It is assumed that the power-saving wireless system saves more power than the wireless LAN, has a short transmission bit length and a high error rate, and uses one kind of frequency band, for example. Each of the "PS mode" and the "normal mode" of the wireless LAN corresponds to a non-power-saving mode of the present invention, for example.

Figure 1:
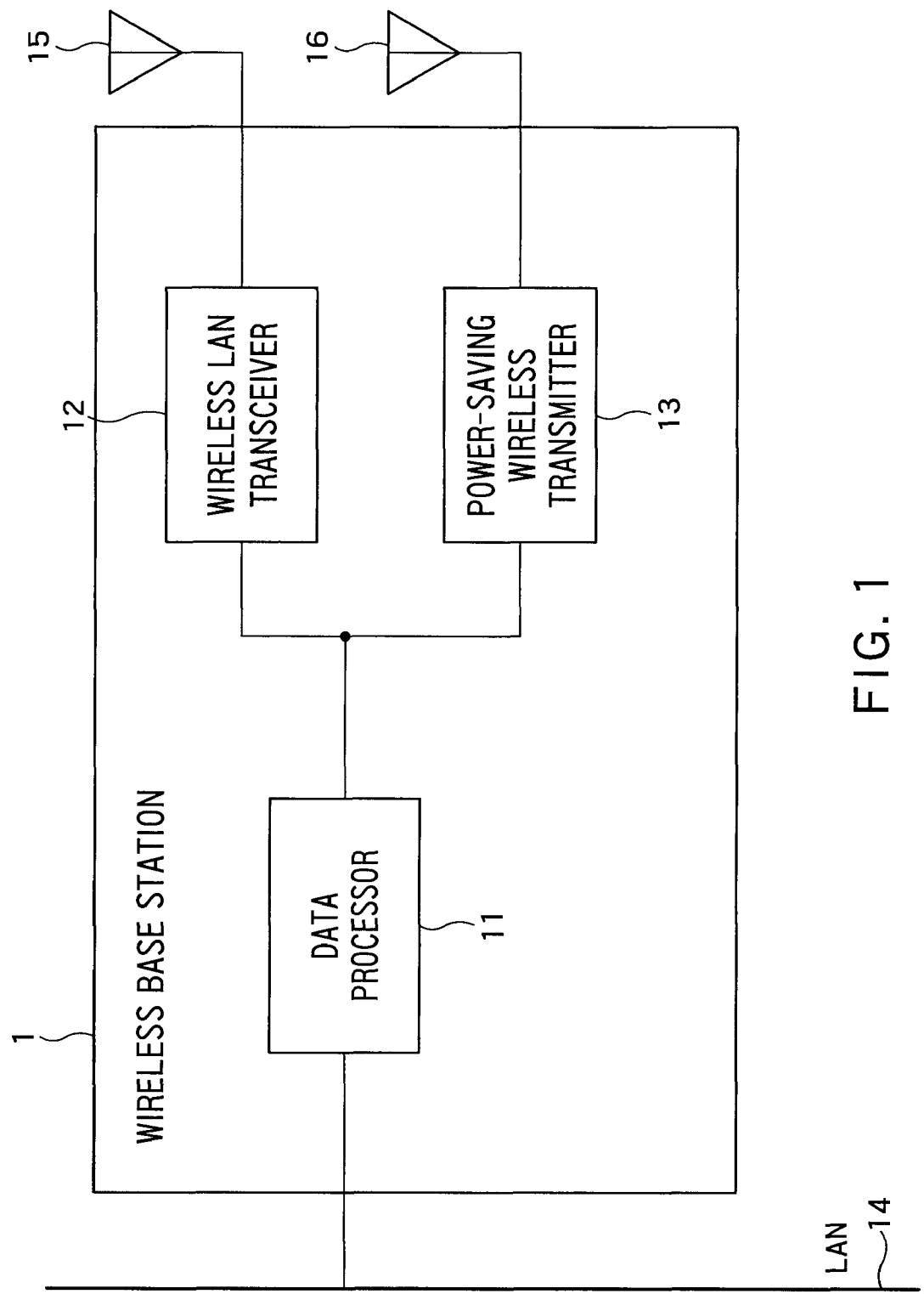
FIG. 1 is a diagram showing the structure of a wireless base station according to a first embodiment.

FIG. 1 shows the structure of a wireless base station. A wireless base station 1 includes: a data processor (switch request frame receiver, notification frame transmitter, and user data transmitter) 11; a wireless LAN transceiver (base-station-side wireless transceiver) 12; and a power-saving wireless transmitter (wireless transmitter) 13. The data processor 11 is wired-connected to a LAN 14 to transmit and receive data through the LAN 14, and controls the wireless base station 1. The wireless LAN transceiver 12 is connected to an antenna 15 for wireless LAN communication, while the power-saving wireless transmitter 13 is connected to an antenna 16 for power-saving wireless communication.

Figure 2:
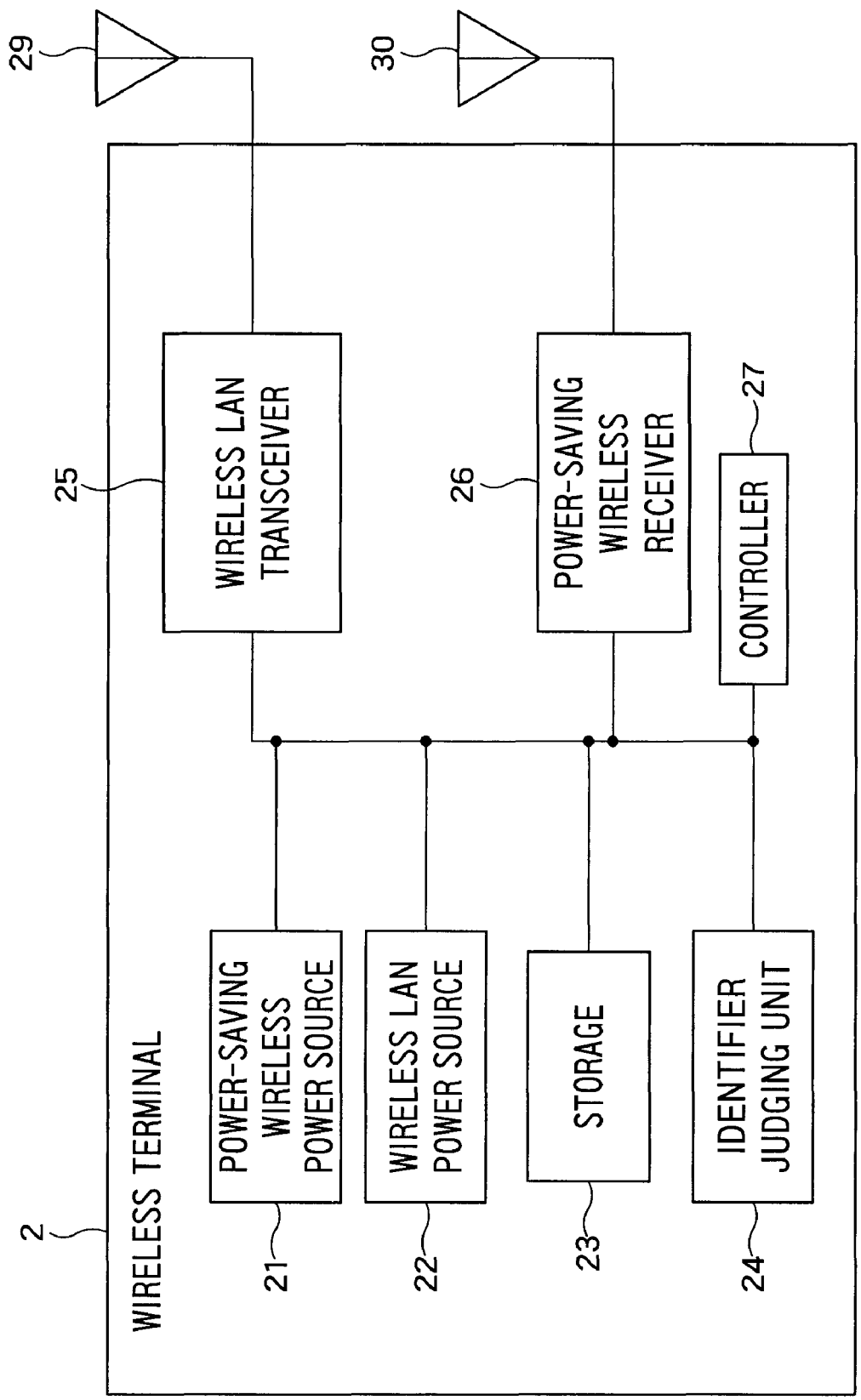
FIG. 2 is a diagram showing the structure of a wireless terminal according to the first embodiment.

FIG. 2 shows the structure of a wireless terminal. A wireless terminal 2 includes: a power-saving wireless power source (second power source) 21; a wireless LAN power source (first power source) 22; a storage 23; an identifier judging unit 24; a wireless LAN transceiver (terminal-side wireless transceiver) 25; a power-saving wireless receiver (wireless receiver) 26; and a controller (first controller, second controller, switch request frame transmitter, power-saving mode switcher, and non-power-saving mode switcher) 27 for controlling the components of the wireless terminal according to the present invention. A communication processor of the present invention has the functions of the identifier judging unit 24 and one function of the controller 27, for example. The storage 23 is a nonvolatile memory such as an MRAM, which can read and write data at high speed and can update the data again and again. The wireless LAN transceiver 25 is connected to an antenna 29 for wireless LAN communication, while the power-saving wireless receiver 26 is connected to an antenna 30 for power-saving wireless communication. The wireless LAN power source 22 supplies power to the wireless LAN transceiver 25, while the power-saving wireless power source 21 supplies power to the power-saving wireless receiver 26 and the identifier judging unit 24. The controller 27 is supplied with power from a power source separately arranged. Note that the identifier judging unit 24 can be supplied with power from the separately arranged power source, not from the power-saving wireless power source 21. In this case, the functions of the identifier judging unit 24 can be incorporated into the controller 27.

Figure 12:
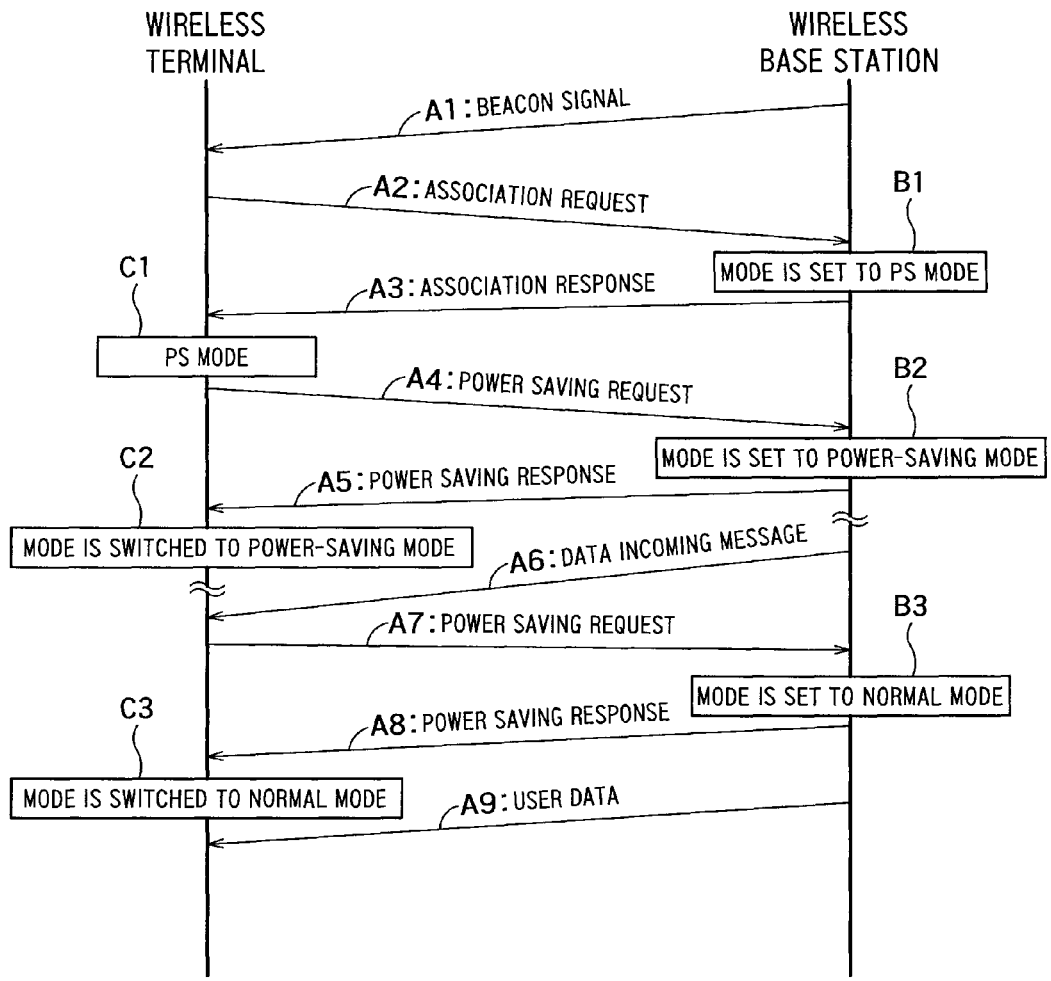
FIG. 12 is a diagram showing sequential steps performed between the wireless terminal and the base station according to the first embodiment.

FIG. 12 is a diagram showing sequential steps for transmitting and receiving messages (control data) between the wireless base station 1 of FIG. 1 and the wireless terminal 2 of FIG. 2. First, the wireless terminal 2 does not establish a link to the wireless base station 1. In the wireless terminal 2 at this time, the wireless LAN power source 22 is turned on and the power-saving wireless power source 21 is turned off.

The wireless LAN transceiver 12 of the wireless base station 1 periodically transmits a beacon, and the wireless LAN transceiver 25 of the wireless terminal 2 detects the beacon and finds the wireless base station 1 to establish a link (A1 to A3). In FIG. 12, the beacon is transmitted only once for simplifying explanation. However, in fact, the beacon is periodically transmitted in the following sequential steps A2 to A9.

Figure 4:
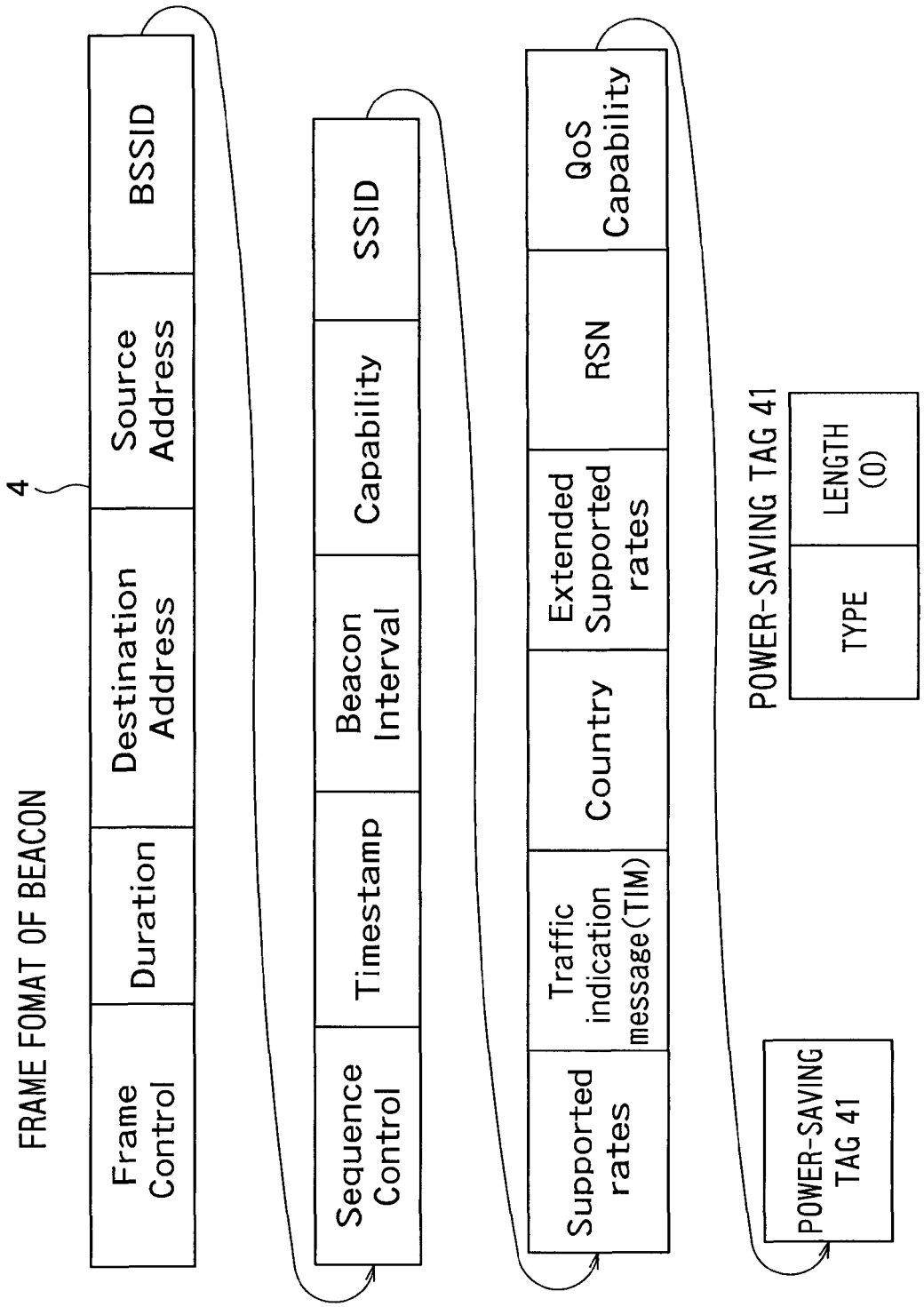
FIG. 4 is a diagram showing the frame format of a beacon.

FIG. 4 shows a frame format 4 of the beacon. This beacon frame is characterized in that a power-saving tag of the present invention is specially added at the end. A power-saving tag 41 includes a type and a length, and the value of the length is 0. When the power-saving tag 41 is added, the wireless base station 1 can use the power-saving mode of the present invention. When the power-saving tag 41 is not added, the wireless base station 1 does not use the power-saving mode of the present invention.

As stated above, the wireless base station 1 periodically transmits the beacon having the power-saving tag added thereto (A1).

The wireless LAN transceiver 25 of the wireless terminal 2 transmits an Association Request frame to the wireless base station 1 by using the wireless LAN to establish a communication link (A2). In this example, when the link is established, setting of the PS mode and setting for the power-saving mode (whether or not to use the power-saving mode) are carried out between the wireless terminal 2 and the base station 1. Concretely, the interval at which the wireless base station transmits the beacon in the PS mode is set to the value of the Listen Interval field of the Association Request transmitted from the wireless terminal, and the power-saving tag of the present invention is added at the end of the frame. That is, a Vendor Specific tag can be added at the end of the frame as needed. In the present embodiment, the power-saving tag is added at the end of the frame as the Vendor Specific tag.

Figure 3:
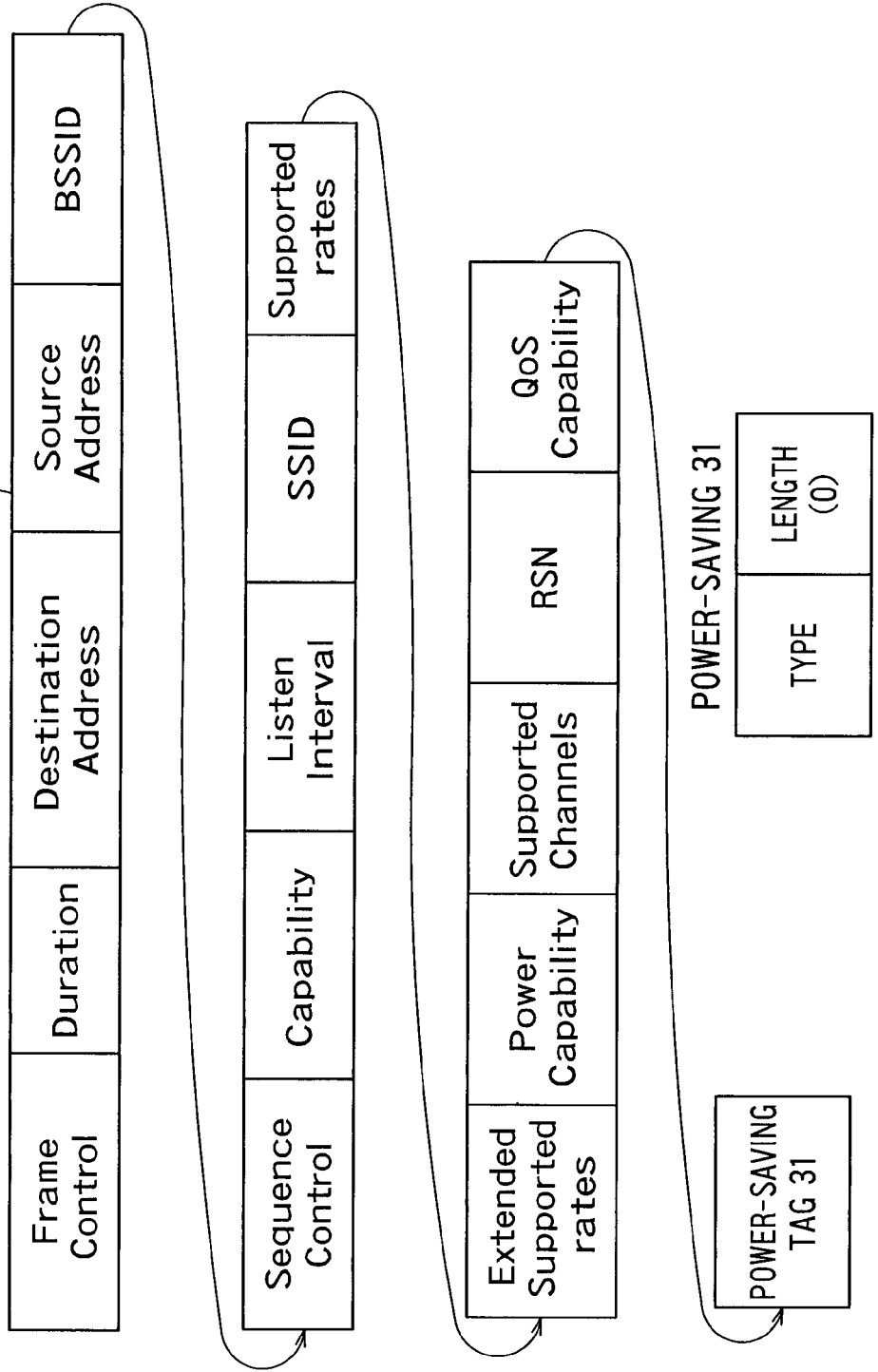
FIG. 3 is a diagram showing the frame format of an Association Request.

FIG. 3 shows a frame format 3 of the Association Request having the power-saving tag added thereto according to the present invention. A power-saving tag 31 includes a type and a length, and the value of the length is 0. When the power-saving tag 31 is added, the wireless terminal 2 can use the power-saving mode of the present invention. When the power-saving tag 31 is not added, the wireless terminal 2 does not use the power-saving mode of the present invention.

Figure 5:
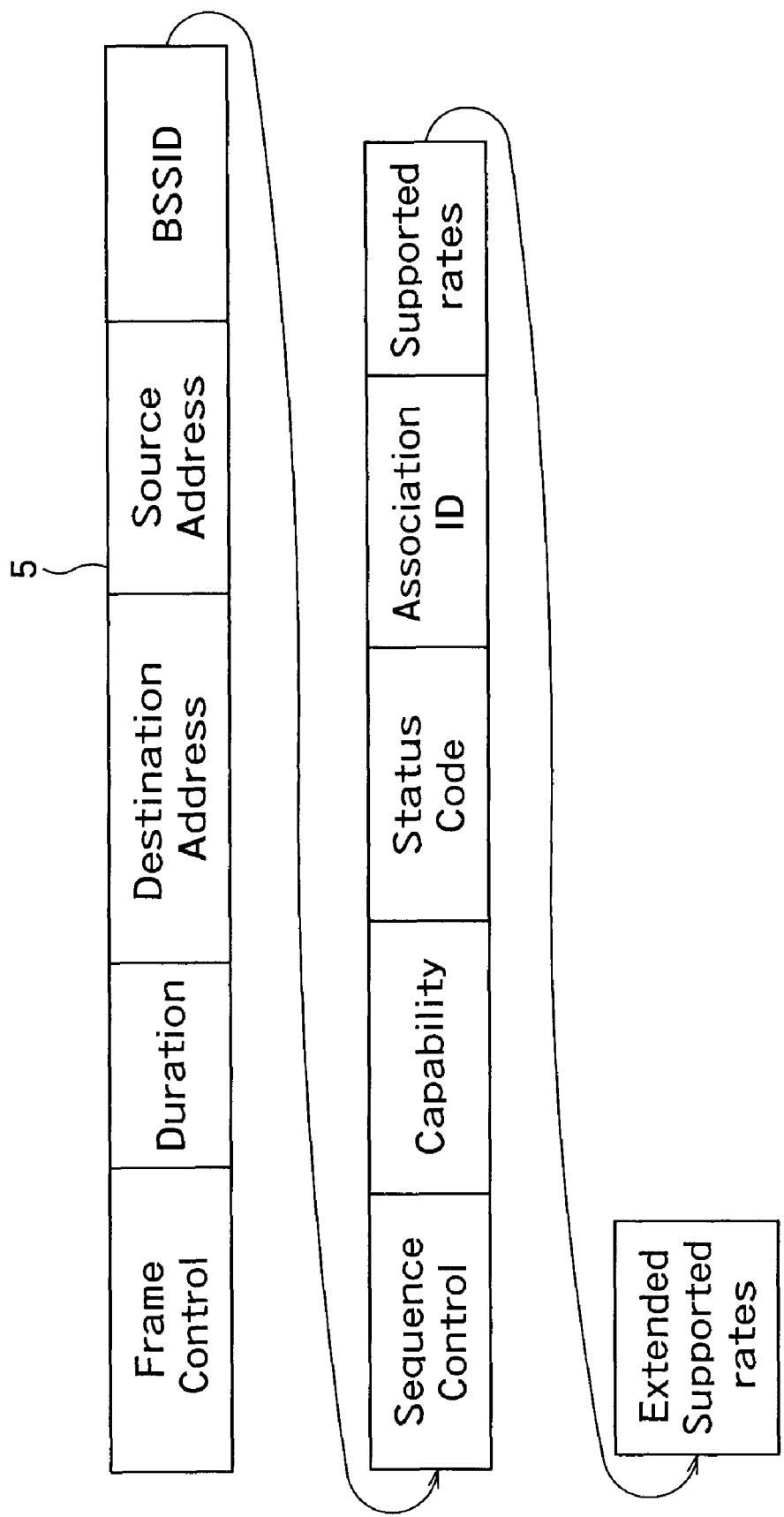
FIG. 5 is a diagram showing the frame format of an Association Response.

The data processor 11 of the wireless base station 1 receives the Association Request frame through the wireless LAN transceiver 12, assigns an identifier called an Association ID to the wireless terminal 2, sets the mode of the wireless terminal 2 to the PS mode (B1), and transmits, from the wireless LAN transceiver 12, an Association Response to the wireless terminal 2 (A3). FIG. 5 shows a frame format 5 of the Association Response. The Association ID is an identifier which is unique in the wireless base station 1 and is assigned with one or more values in a 16-bit value range, for example.

The data processor 11 of the wireless base station 1 manages a table to relate the Association ID, the MAC address of the wireless terminal 2, and the mode of the wireless terminal 2, and registers a record of the wireless terminal 2 having the assigned identifier.

FIG. 6 shows a table 6 managed by the data processor 11 of the wireless base station 1. The table 6 manages the relationship among the MAC address, the Association ID, and the mode (normal mode, PS mode, or power-saving mode). In the example of FIG. 6, the base station 1 establishing a wireless link to the wireless terminal 2 having the MAC address of "aa.bb.cc.dd.ee.ff" assigns the Association ID of 0x0001, and sets the power-saving mode. Further, the base station 1 establishing a link to another wireless terminal 2 assigns the Association ID of 0x0002, relates the Association ID to the MAC address (ab.cd.ef.11.22.33) of the another wireless terminal 2, and sets the normal mode. In addition, the base station 1 establishing a link to a further another wireless terminal 2 assigns the Association ID of 0x0003, relates the Association ID to the MAC address (ac.bd.af.44.55.66) of the further another wireless terminal 2, and sets the PS mode.

The controller 27 of the wireless terminal 2 receives the Association Response from the base station 1 through the wireless LAN transceiver 25 (A3), stores the Association ID in the storage 23, and sets the wireless terminal 2 to the PS mode (C1). In the PS mode, the wireless terminal 2 turns off the power (wireless LAN power source 22) for performing communication when the data to be transmitted is not existent, but turns on the wireless LAN power source 22 and periodically receives the beacon from the wireless base station 1 at the intervals of one or a plurality of beacons in order to detect the existence or nonexistence of the data addressed to the wireless terminal 2. The beacon includes a Traffic Indication Message (TIM), which is information showing the terminal to which the data received by the wireless base station is addressed, (see FIG. 4). The wireless terminal detects the Traffic Indication Message to receive the data.

FIG. 7 shows a format of the TIM. The TIM includes an Element ID, a Length, a DTIM Count, a DTIM Period, and a Partial Virtual Bitmap. The value of the Element ID is 5, the Length shows the length value of the TIM, and the DTIM Count shows the number of the DTIM after the last DTIM (Delivery the Traffic Indication Message) is transmitted. The DTIM is a parameter which is included in the Partial Virtual Bitmap and is notified to the wireless terminal 2 with being included in the beacon when broadcast data or multicast data is existent in the wireless base station 1. For example, the case that the value of the DTIM Count is zero means that the DTIM is being transmitted. The DTIM Period represents intervals at which the wireless base station 1 transmits the beacon including the DTIM. The Partial Virtual Bitmap is used when the data addressed to the wireless terminal is arrived to the wireless base station 1. For example, when the data addressed to the wireless terminal 2 having the Association ID of 1 is arrived to the wireless base station 1, the value of the 1st bit of the Partial Virtual Bitmap becomes 1. Data addressed to a plurality of the wireless terminals 2 is arrived to the wireless base station 1, the value of the bit corresponding to the value of each Association ID becomes 1. The value of the 0th bit becomes 1 when a broadcast or multicast message is arrived to the wireless base station 1.

When the wireless terminal 2 is required to change its mode from the PS mode to the normal mode, the controller 27 transmits a data frame having of the power management bit of 0 to the wireless base station 1 through the wireless LAN transceiver 25. Further, when the wireless terminal 2 is required to change its mode from the normal mode to the PS mode, the controller 27 transmits a data frame having the power management bit of 1 in the flag of a frame control field to the wireless base station 1 through the wireless LAN transceiver 25. In this way, the data processor 11 of the wireless base station 1 detects that the wireless terminal 2 enters into the PS mode.

When the wireless terminal 2 is switched to the power-saving mode of the present invention, the controller 27 transmits a power-saving request message 8 to the wireless base station 1 through the wireless LAN transceiver 25 (A4).

Figure 8:
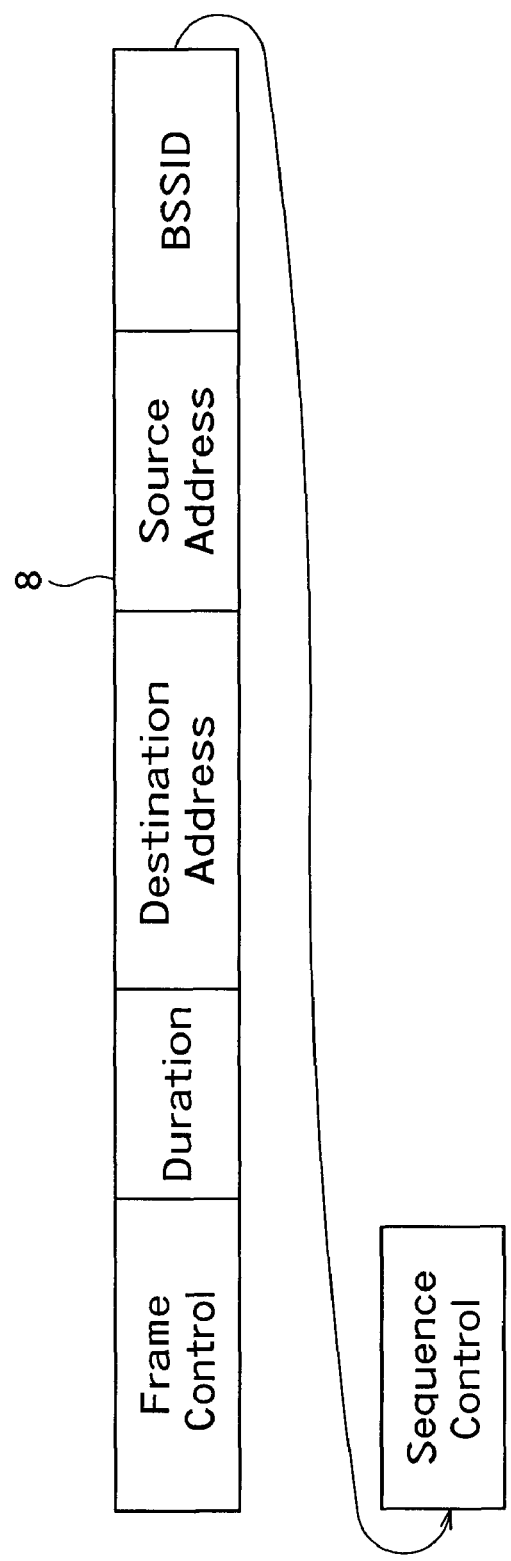
FIG. 8 is a diagram showing the frame format of a power saving request.

FIG. 8 shows the frame format of the power-saving request message 8. The Frame Control field includes a version, a type, a subtype, and a flag. The type has the value of 1 representing the control frame, and the subtype has a unique value representing the power-saving request message. For example, it is possible to use a value which is disregarded as being Reserved under IEEE standard 802.11. The power management bit in the flag of the frame control field is set to 1 to show that the wireless terminal 2 enters into the power-saving mode. Note that the frame control field is provided in common to various frames used in the wireless LAN. The power-saving request message having the power management bit of 1 corresponds to a switch request frame for requesting a switch to the power-saving mode of the present invention. The controller 27 includes a switch request frame transmitter which transmits the switch request frame through the wireless LAN transceiver 25.

The data processor 11 of the wireless base station 1 receives the power-saving request message 8 through the wireless LAN transceiver 12, and updates the table 6 so that the mode of the wireless terminal from which the power-saving request message 8 is transmitted is switched to the power-saving mode (B2), and then transmits a power-saving response message 9 to the wireless terminal 2 through the wireless LAN transceiver 12 (A5).

Figure 9:
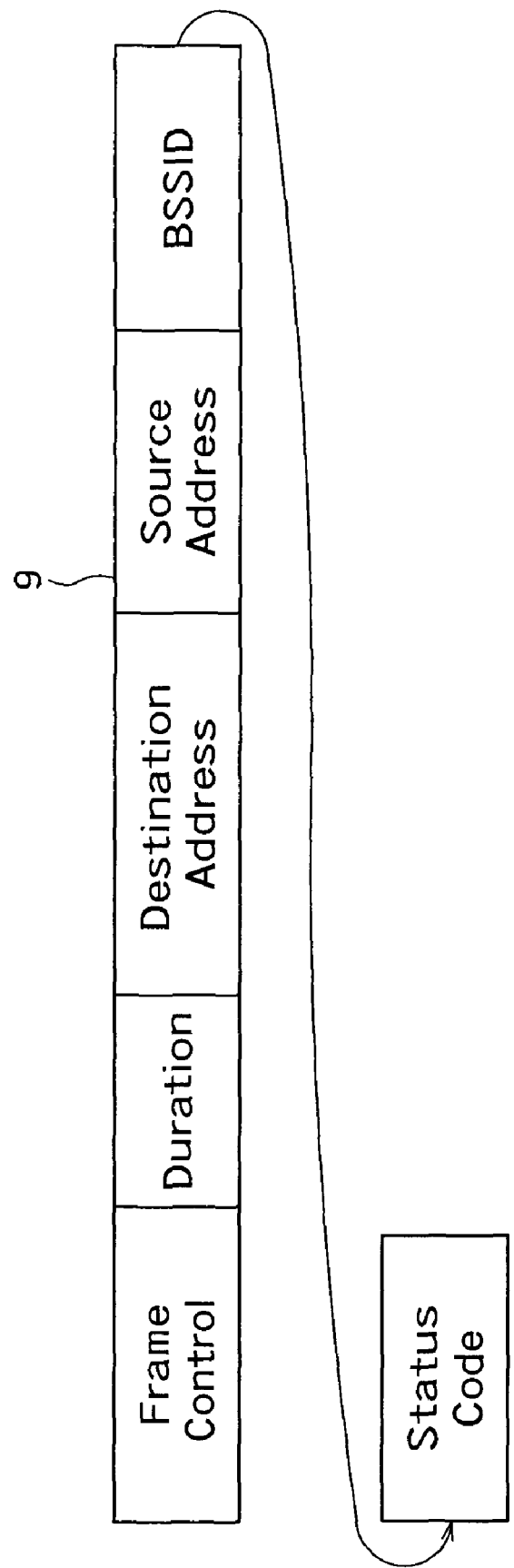
FIG. 9 is a diagram showing the frame format of a power saving response.

FIG. 9 shows the frame format of the power-saving response message 9. The type of the Frame Control has the value of 1 representing the control frame, and the subtype has the value of 2, which is treated as being Reserved under IEEE standard 802.11, for example. The value of a Status Code is 0 when the power-saving mode is successful, and is 1 when the power-saving mode is not successful. The power-saving response message 9 having the value of 0 representing the success corresponds to a permission frame for permitting a switch to the power-saving mode of the present invention, for example.

The controller 27 of the wireless terminal 2 receives the power-saving response message 9 through the wireless LAN transceiver 25, stores in the storage 23 parameters required to communicate with the wireless base station 1 which establishes a link connection to the wireless terminal 2, and switches its mode to the power-saving mode by turning off the wireless LAN power source 22 and turning on the power-saving wireless power source 21 (C2). The parameters stored in the storage 23 are, for example, BSSID, ESSID, channel number, encryption key, etc. of the wireless base station 1. Note that the parameters can be stored previously, for example, at the point when the wireless terminal 2 receives the Association Response frame.

Power supply to the wireless LAN transceiver 25 is stopped by turning off the wireless LAN power source 22, and power supply to the power-saving wireless receiver 26 is started by turning on the power-saving wireless power source 21. The power consumption of the power-saving wireless receiver 26 is lower than that of the wireless LAN transceiver 25. Accordingly, the power consumption in the power-saving mode of the present invention is lower than that in the PS mode of the wireless LAN. Even when the power-saving wireless power source 21 supplies power to the identifier judging unit 24, the value of the power is sufficiently small, which leads to a small power consumption as a whole.

When the data processor 11 of the wireless base station 1 transmits the power-saving response message 9 through the wireless LAN transceiver 12 and receives user data from the LAN 14, the data processor 11 refers to the table 6 and performs normal operation under IEEE standard 802.11 if the user data is not addressed to the wireless terminal 2 in the power-saving mode (if the wireless terminal is in the normal mode or the PS mode). When the wireless terminal 2 is in the power-saving mode and the user data is unicast or broadcast data, or when the wireless terminal 2 is in the power-saving mode and the user data is multicast data of a multicast group to which the wireless terminal 2 belongs, the power-saving wireless transmitter 13 transmits a data incoming message 100 newly defined in the present embodiment (A6). The data incoming message 100 corresponds to an example of the notification frame for notifying that the user data addressed to the wireless terminal 2 of the present invention is existent.

Figure 10:
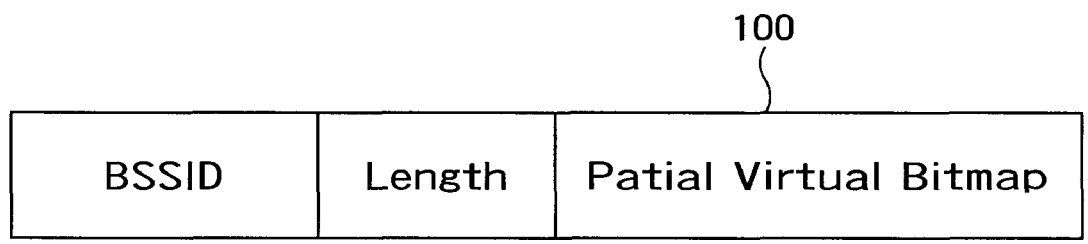
FIG. 10 is a diagram showing the format of a data incoming message.

FIG. 10 shows the data incoming message 100. The data incoming message 100 includes a BSSID, a Length, and a Partial Virtual Bitmap. The value of the BSSID shows the BSSID of the wireless base station 1, the Length shows the length of the Partial Virtual Bitmap, and the Partial Virtual Bitmap shows a bit map in which the bit corresponding to the Association ID of the wireless terminal 2 is 1 as in IEEE standard 802.11. In this case, when a long bit string cannot be transmitted and received due to a high error rate based on the characteristics of power-saving wireless communication, it is possible to compress the Partial Virtual Bitmap or to use a hash value for making the bit length short. Alternatively, a parity bit can be employed in view of the high error rate.

The wireless terminal 2 in the power-saving mode can receive only the data incoming message 100 from the wireless base station 1. When the wireless terminal 2 receives the data incoming message 100, the data incoming message 100 is processed by the power-saving wireless receiver 26 and is transmitted to the identifier judging unit 24.

The identifier judging unit 24 determines whether or not the data incoming message 100 includes the information addressed to the wireless terminal 2. The identifier judging unit 24 reads the value of the BSSID and the value of the Association ID from the storage 23 to judge whether or not these values are the same as the values of the data incoming message 100, and performs no process if the same values are not found. When the same values are found, or when the data incoming message 100 is a broadcast message or a multicast message of a multicast group to which the wireless terminal 2 belongs, the identifier judging unit 24 turns on the wireless LAN power source 22.

When the wireless LAN power source 22 is turned on, the wireless LAN transceiver 25 reads from the storage 23 parameters required for wireless LAN communication, and transmits the power-saving request frame 8 to the wireless base station 1 again (A7). At this time, the power management bit in the flag of the frame control field of the power-saving request frame 8 is set to zero, which notifies that the wireless terminal 2 is returned to the normal mode from the power-saving mode.

The data processor 11 of the wireless base station 1 receives the power-saving request frame 8 from the wireless terminal 2 through the wireless LAN transceiver 12, and refers to the table 6 to update the corresponding record so that the mode (of the wireless terminal 2 which has transmitted the frame) is switched from the power-saving mode to the normal mode (B3). Then, the data processor 11 transmits the power-saving response frame 9 to the wireless terminal 2 through the wireless LAN transceiver 12 (A8). At this time, the value of the Status Code of the power-saving response frame 9 is zero representing success. After that, the data processor 11 of the wireless base station 1 transmits the data (user data) addressed to the wireless terminal 2 through the wireless LAN transceiver 12 (A9).

The controller 27 of the wireless terminal 2 receives the power-saving response frame 9 through the wireless LAN transceiver 25 in step A8, recognizes that the switch to the normal mode is successfully achieved in the wireless base station 1, and turns off the power-saving wireless power source 21 to stop supplying power to the power-saving wireless receiver 26, by which the wireless terminal 2 is switched to the normal mode (C3).

In this example, the user data is received by switching the mode from the power-saving mode to the normal mode. However, the user data can be received by switching the mode to the PS mode. The wireless terminal 2 transmits the power-saving request 8 to receive the user data from the wireless the base station 1, which shows that the power-saving request 8 corresponds to one configuration of the request frame for acquiring the user data of the present invention.

As explained above, according to the present embodiment, power can be saved by using a radio frequency communication of saving power when the wireless terminal does not perform communication. Therefore, battery consumption of the wireless terminal can be restrained, which makes it possible to drive the wireless terminal for a longer period.

(Second Embodiment)

Figure 11:
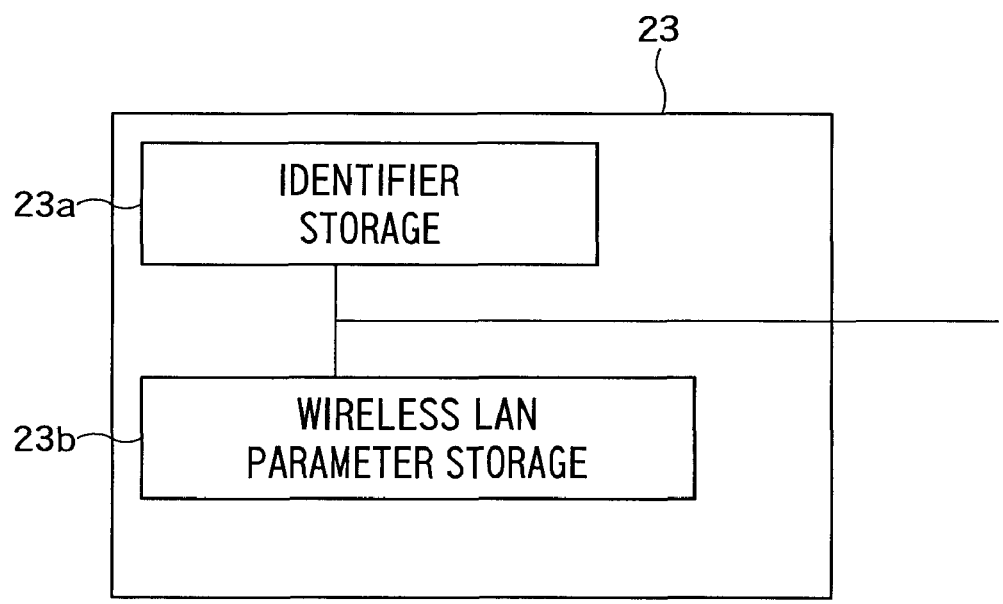
FIG. 11 is a diagram showing a structural example of a storage 23.

The storage 23 of the wireless terminal 2 in FIG. 2 can be formed of a volatile memory such as a DRAM, which requires the power source to be turned on all the time. However, the storage 23 can be divided into optimum memories according to the information to be stored so that power can be further saved as shown in FIG. 11. The storage 23 shown in FIG. 11 includes an identifier storage 23*a* (second storage) and a wireless LAN parameter storage 23*b* (first storage), which are separated from each other. In this case, each of the memories used in the identifier storage 23*a* and the wireless LAN parameter storage 23*b* is a nonvolatile memory such as an MRAM, which can rewrite data again and again.

When the storage 23 having the above structure is used and the power-saving wireless power source 21 is turned off in the normal mode (or the PS mode), the identifier storage 23*a* is not supplied with power and only the wireless LAN parameter storage 23*b* is supplied with power from the wireless LAN power source 22. When a link connection to the wireless base station 1 is established, parameters required for the wireless LAN communication are stored in the wireless LAN parameter storage 23*b*. When the mode is switched from the normal mode (or the PS mode) to the power-saving mode, a power saving response from the wireless base station 1 is received and the power-saving request is judged to be successful, by which the power-saving wireless power source 21 is turned on to supply power to the identifier storage 23*a* and to store the BSSID and the Association ID of the wireless base station in the identifier storage 23*a* while the wireless LAN power source 22 is turned off to stop supplying power to the wireless LAN parameter storage 23*b*.

When receiving the data incoming message 100 (see FIG. 10) from the wireless base station 1, the identifier judging unit 24 reads the BSSID and the Association ID from the identifier storage 23*a*, and judges whether or not these values are the same as the information of the data incoming message 100.

When the mode returns from the power-saving mode to the normal mode (or the PS mode), the wireless terminal 2 turns on the wireless LAN power source 22 to supply power to the wireless LAN parameter storage 23*b*. The wireless LAN transceiver 25 is similarly supplied with power, and reads necessary parameters from the wireless LAN parameter storage 23*b* to restart the wireless LAN communication with the wireless base station 1. When the mode is returned to the normal mode (PS mode), the power-saving wireless power source 21 is turned off to stop supplying power to the identifier storage 23*a* again.

As stated above, according to the present embodiment, power can be further saved.

(Third Embodiment)

Figure 13:
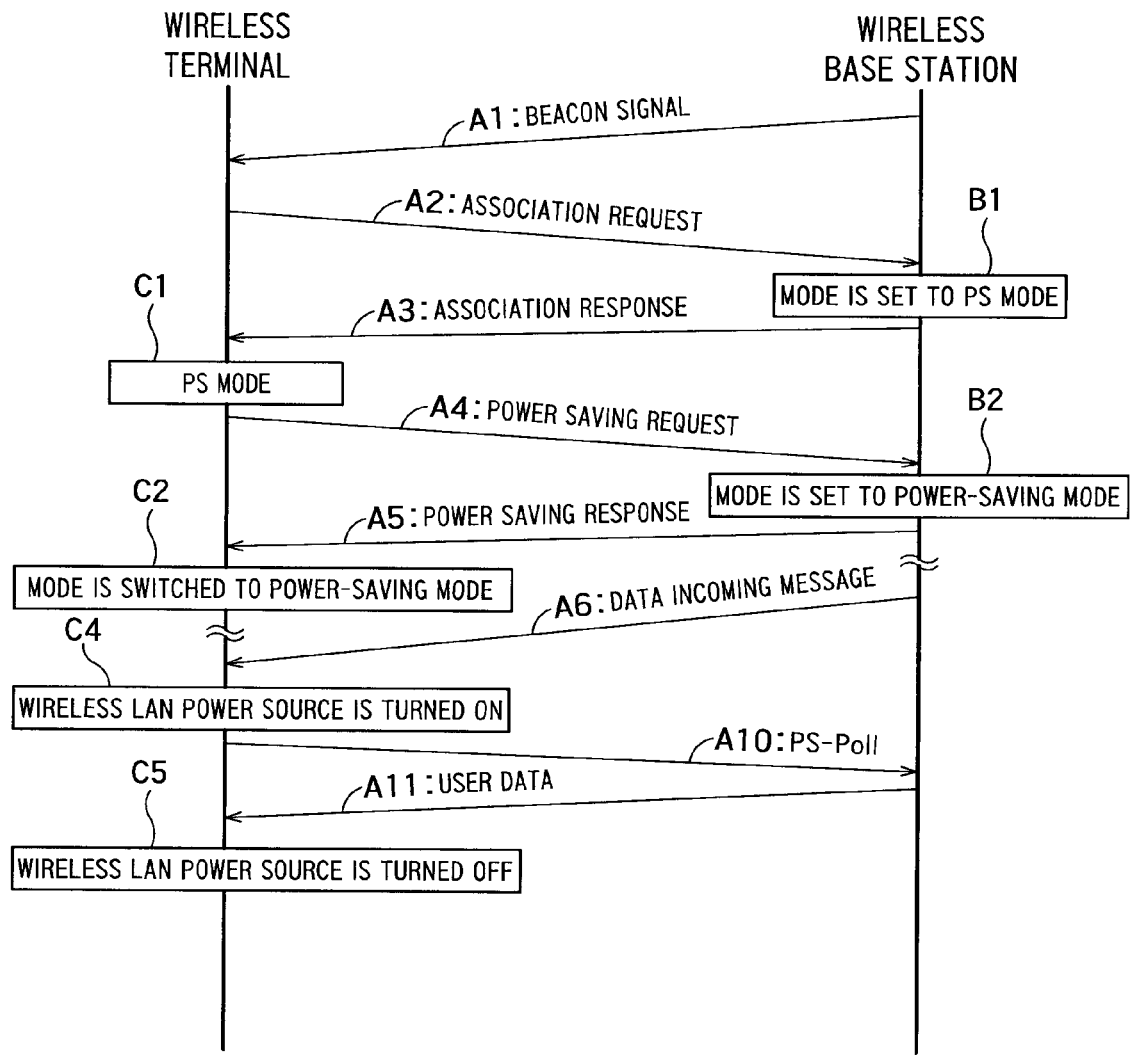
FIG. 13 is a diagram showing sequential steps performed between a wireless terminal and a base station according to a third embodiment.

In the first embodiment, the wireless terminal 2 detects through power-saving wireless communication that the wireless base station 1 receives the data addressed to the wireless terminal 2 in the power-saving mode, and returns to the normal mode to receive the data (A5 to A9). However, if the wireless terminal 2 returns to the power-saving mode after receiving the data, the more rapidly operation of receiving the data can be carried out with a more simple method. FIG. 13 shows sequential steps according to the present embodiment. FIG. 13 is different from FIG. 12 in the sequential steps after step A6.

For example, the identifier judging unit 24 detects that the wireless base station 1 has the data addressed to the wireless terminal 2 in step A6, and turns on the wireless LAN power source 22 (C4) to supply power to the wireless LAN transceiver 25 and the wireless LAN parameter storage 23*b*. Then, the wireless LAN transceiver 25 reads parameters required for wireless LAN communication from the wireless LAN parameter storage 23*b*. At this time, the power-saving wireless power source 21 remains to be turned on. Then, not the power-saving request frame 8 but the PS-Poll message (acquisition request frame) used in IEEE standard 802.11 is transmitted to the wireless base station 1 (A10), and the user data from the wireless base station 1 is received (A11). After receiving the data, the wireless LAN power source 22 is turned off (C5) to stop supplying power to the wireless LAN transceiver 25 and the wireless LAN parameter storage 23*b* so that the mode is switched to the power-saving mode again, and only the power-saving wireless receiver 26, the identifier storage 23*a*, and the identifier judging unit 24 are supplied with power, waiting the data incoming message 100 from the wireless base station 1.

On the other hand, the wireless base station 1 receives the PS-Poll, and transmits the user data corresponding to the wireless terminal 2 by using a standard method (A11). When the user data addressed to the wireless terminal 2 in the power-saving mode is received again from the LAN 14 or another wireless terminal, a data incoming message is transmitted by using the power-saving wireless communication.

Figure 14:
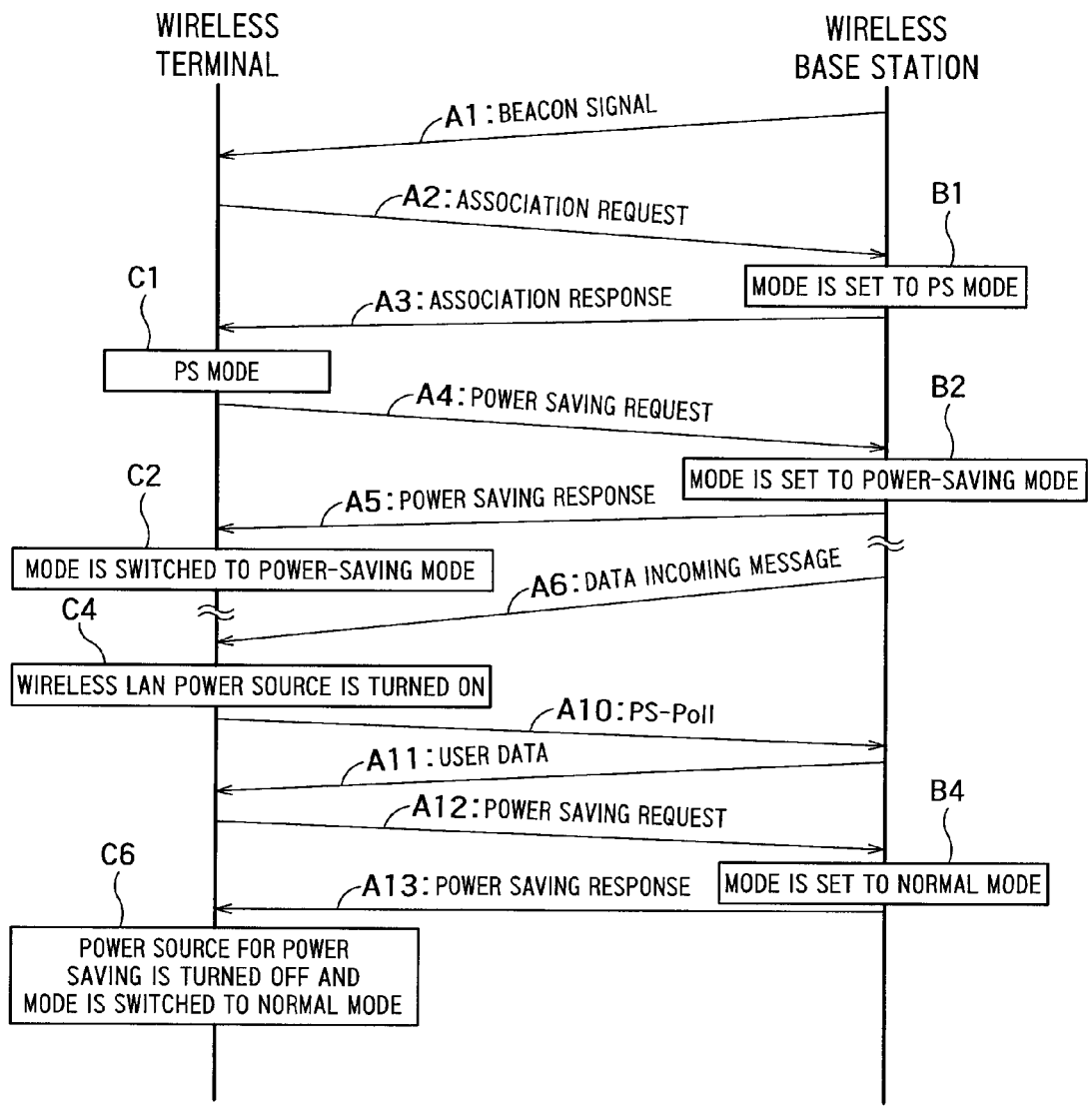
FIG. 14 is a diagram showing an example in which the sequential steps of FIG. 13 are partially changed.

When the wireless terminal 2 is required to enter into the normal mode after receiving the user data by using the PS-Poll, the sequential steps of FIG. 13 can be partially changed as shown in FIG. 14. That is, after receiving the user data in step A11, the power-saving request frame 8 having the power management bit of 0 is transmitted to the wireless base station 1 (A12) without turning off the wireless LAN power source 22, and the power-saving wireless power source is turned off (C6) if the power-saving response frame 9 from the wireless base station 1 is successful (A13), by which the wireless terminal 2 can smoothly enter into the normal mode.

In this case, the wireless base station 1 receives the power-saving request frame 8, and refers to and updates the table 6 so that the mode of the corresponding wireless terminal 2 is switched from the power-saving mode to the normal mode (B4).

As stated above, according to the present embodiment, the mode can be switched to a desired mode rapidly after receiving the user data.

(Fourth Embodiment)

The data processor 11 of the wireless base station 1 can periodically transmit the data incoming message 100 (existence confirmation message) which is blank through the power-saving wireless transmitter 13 in order to detect the case in which the wireless terminal 2 in the power-saving mode moves away from the wireless base station 1 and cannot receive the power-saving wireless signal from the wireless base station 1.

Even when the wireless base station 1 receives no data, the wireless base station 1 transmits the blank data incoming message to the wireless terminal 2 in the power-saving mode to notify that the wireless terminal 2 is within the coverage area of the power-saving wireless communication of the wireless base station 1. Although the blank data incoming message has the same format as the data incoming message 100 (see FIG. 10), only the BSSID is transmitted. The wireless terminal 2 receives the blank data incoming message and transmits the message to the identifier judging unit 24, but the identifier judging unit 24 performs no process because the blank data incoming message does not include the Length and the Partial Virtual Bitmap.

The intervals at which the blank data incoming message or the data incoming message is transmitted from the wireless base station 1 can be fixed or freely set. The intervals can be fixed to be the same as the beacon intervals, for example. Further, the message intervals can be previously set in the wireless base station 1 and be added to the beacon by notifying the wireless terminal 2 of the message intervals by using the Vendor Specific tag, for example.

Figure 15:
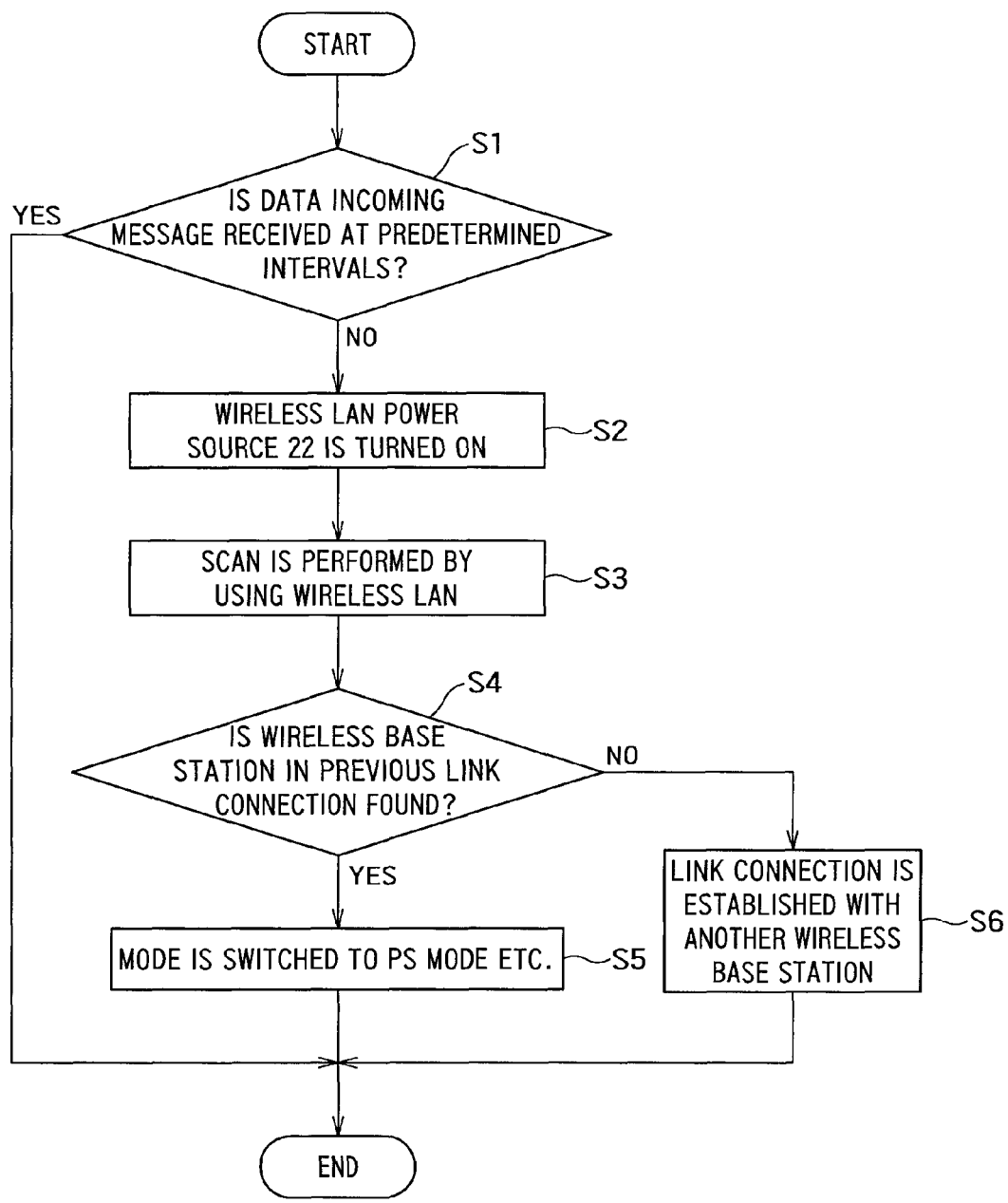
FIG. 15 a flow chart explaining the operation of a wireless terminal according to a fourth embodiment.

FIG. 15 is a flow chart explaining the operation of the wireless terminal 2 according to the present embodiment.

The identifier judging unit 24 of the wireless terminal 2 judges whether or not the data incoming message 100 is received at predetermined intervals (S1). When the data incoming message 100 is received at the predetermined intervals, the process ends (YES in S1). When the data incoming message 100 is not received at the predetermined intervals (NO in S1), the wireless terminal 2 is judged to be out of the coverage area of the power-saving wireless communication of the wireless base station 1, and the wireless LAN power source 22 is turned on to supply power to the wireless LAN transceiver 25 (S2), and then scan is performed by using the wireless LAN transceiver 25 (S3). If the wireless base station 1 previously establishing a link connection to the wireless terminal 2 is found (YES in S4), the wireless terminal 2 is judged to be out of the coverage area of the power-saving wireless communication, and a process to switch the mode to the PS mode is performed, for example (S5). If the wireless base station 1 previously establishing a link connection to the wireless terminal 2 is not found, the wireless terminal 2 establishes a link connection to another wireless base station, for example, and the mode is switched to an appropriate mode (S6).

When the wireless base station 1 transmits the data incoming message 100 and does not receive the PS-Poll or the power-saving request frame 8 from the wireless terminal 2 to which the received data is addressed, the data processor 11 erases the data after a predetermined timeout period passes. The timeout period is previously set in the Listen Interval field of the Association Request, for example, or is set by transmitting the Association Request frame in which a timeout value is newly added to the Vendor Specific tag.

Since each of the first to fourth embodiments as explained above operates independently of every function based on IEEE standard 802.11, a standard wireless LAN terminal, the wireless terminal 2 of the present invention, a standard wireless LAN base station, and the wireless base station 1 of the present invention can coexist with one another while keeping compatibility. Further, the present invention independently operates regardless of the existence or nonexistence of security functions for wireless LAN communication.

What is claimed is:

1. A wireless terminal for communicating with a base station, the base station having a base-station-side wireless transceiver which transmits and receives a signal, and the base station having a wireless transmitter which transmits a signal and operates with lower power than the base-station-side wireless transceiver, the wireless terminal comprising:
a terminal-side wireless transceiver configured to communicate with the base-station-side wireless transceiver;
a first power source configured to supply power to the terminal-side wireless transceiver;
a wireless receiver configured to receive the signal transmitted from the wireless transmitter and to operate with lower power than the terminal-side wireless transceiver;
a second power source configured to supply power to the wireless receiver;
a first controller configured to perform control so that the first power source is turned on and the second power source is turned off in a non-power-saving mode, in which the base-station-side wireless transceiver and the terminal-side wireless transceiver communicates with each other;
a second controller configured to perform control so that the first power source is turned off and the second power source is turned on in a power-saving mode, in which the wireless transmitter and the wireless receiver communicates with each other;
a switch request frame transmitter configured to transmit, in the non-power-saving mode, a switch request frame for switching a mode to the power-saving mode to the base station through the terminal-side wireless transceiver;
a power-saving mode switcher configured to switch the mode to the power-saving mode when the terminal-side wireless transceiver receives, from the base station, a permission frame for permitting the mode to be switched to the power-saving mode; and
a communication processor configured to acquire user data from the base station by turning on the first power source and transmitting an acquisition request frame for acquiring the user data through the terminal-side wireless transceiver when in the power-saving mode, the wireless receiver receives a notification frame notifying that the user data addressed to the wireless terminal is existent from the base station.

2. The terminal according to claim 1, wherein the communication processor turns off the first power source after acquiring the user data.

3. The terminal according to claim 2, wherein the communication processor transmits, to the base station, a PS-Poll message defined by IEEE standard 802.11 as the acquisition request frame.

4. The terminal according to claim 1, wherein the communication processor transmits a switch request frame for switching the mode to the non-power-saving mode as the acquisition request frame when receiving the notification frame, and switches the mode to the non-power-saving mode to acquire the user data from the base station when receiving the permission frame for permitting the mode to be switched to the non-power-saving mode.

5. The terminal according to claim 4,
wherein the wireless receiver in the power-saving mode receives, from the base station, an existence confirmation frame at predetermined intervals, and
wherein the communication processor performs a process to switch the power-saving mode to the non-power-saving mode when the existence confirmation frame is not received at the predetermined intervals.

6. The terminal according to claim 1 further comprising:
a first nonvolatile storage configured to store a parameter required for the communication between the terminal-side wireless transceiver and the base-station-side wireless transceiver; and
a second nonvolatile storage configured to store a parameter required for the communication between the wireless receiver and the wireless transmitter;
wherein the first controller in the non-power-saving mode performs control so that the first power source supplies power to the first storage and the second power source stops supplying power to the second storage, and
wherein the second controller in the power-saving mode performs control so that the first power source stops supplying power to the first storage and the second power source supplies power to the second storage.

7. A base station for communicating with a wireless terminal, the wireless terminal having a terminal-side wireless transceiver which transmits and receives a signal and a wireless receiver which receives a signal and operates with lower power than the terminal-side wireless transceiver, the base station comprising:
a base-station-side wireless transceiver configured to communicate with the terminal-side wireless transceiver;
a wireless transmitter configured to transmit the signal to the wireless receiver and to operate with lower power than the base-station-side wireless transceiver;
a switch request frame receiver configured to receiver, in a non-power-saving mode in which the base-station-side wireless transceiver and the terminal-side wireless transceiver communicates with each other, a switch request frame for switching a mode to a power-saving mode in which the wireless transmitter and the wireless receiver communicates with each other, from the wireless terminal through the base-station-side wireless transceiver;
a table configured to store an identifier of the wireless terminal which has transmitted the switch request frame;
a notification frame transmitter configured to transmit, when user data addressed to the wireless terminal which of identifier is stored in the table is existent, a notification frame notifying that user data addressed to the wireless terminal is existent, through the wireless transmitter;

a user data transmitter configured to transmit the user data to the wireless terminal through the base-station-side wireless transceiver when an acquisition request frame of the user data is received from the wireless-terminal through the base-station-side wireless transceiver.

8. A wireless communication system comprising a base station and a wireless terminal, the base station comprising a base-station-side wireless transceiver which transmits and receives a signal and a wireless transmitter which transmits a signal and operates with lower power than the base-station-side wireless transceiver, and the wireless terminal comprising a terminal-side wireless transceiver which transmits and receives the signal with the base-station-side wireless transceiver, a wireless receiver which receives the signal from the wireless transmitter and operates with lower power than the terminal-side wireless transceiver, a first power source which supplies power to the terminal-side wireless transceiver, and a second power source which supplies power to the wireless receiver, wherein the wireless terminal performs control so that the first power source is turned on and the second power source is turned off in a non-power-saving mode, in which the base-station-side wireless transceiver and the terminal-side wireless transceiver communicates with each other and control so that the first power source is turned off and the second power source is turned on in a power-saving mode, in which the wireless transmitter and the wireless receiver communicates with each other;

the wireless terminal transmits, in the non-power-saving mode, a switch request frame for switching a mode to the power-saving mode to the base station through the terminal-side wireless transceiver;

the base station stores an identifier of the wireless terminal which has transmitted the switch request frame in a storage provided therein and transmits a permission frame for permitting the mode to be switched to the power-saving mode through the base-station-side wireless transceiver;

the wireless terminal switches the mode to the power-saving mode when the permission frame is received;

the base station transmits, when user data addressed to the wireless terminal which of identifier is stored in the storage is existent, a notification frame notifying that user data addressed to the wireless terminal is existent, through the wireless transmitter;

the wireless terminal turns on the first power source and transmits an acquisition request frame for acquiring the user data through the terminal-side wireless transceiver when the notification frame is received through the wireless receiver; and the base station transmits the user data to the wireless terminal through the base-station-side wireless transceiver when the acquisition request frame is received through the base-station-side wireless transceiver.

9. A wireless communication method between a base station and a wireless terminal, the base station comprising a base-station-side wireless transceiver which transmits and receives a signal and a wireless transmitter which transmits a signal and operates with lower power than the base-station-side wireless transceiver, and the wireless terminal comprising a terminal-side wireless transceiver which transmits and receives the signal with the base-station-side wireless transceiver, a wireless receiver which receives the signal from the wireless transmitter and operates with lower power than the terminal-side wireless transceiver, a first power source which supplies power to the terminal-side wireless transceiver, and a second power source which supplies power to the wireless receiver, wherein the wireless terminal performs control so that the first power source is turned on and the second power source is turned off in a non-power-saving mode, in which the base-station-side wireless transceiver and the terminal-side wireless transceiver communicates with each other and control so that the first power source is turned off and the second power source is turned on in a power-saving mode, in which the wireless transmitter and the wireless receiver communicates with each other;

the wireless terminal transmits, in the non-power-saving mode, a switch request frame for switching a mode to the power-saving mode to the base station through the terminal-side wireless transceiver;

the base station stores an identifier of the wireless terminal which has transmitted the switch request frame in a storage provided therein and transmits a permission frame for permitting the mode to be switched to the power-saving mode through the base-station-side wireless transceiver;

the wireless terminal switches the mode to the power-saving mode when the permission frame is received;

the base station transmits, when user data addressed to the wireless terminal which of identifier is stored in the storage is existent, a notification frame notifying that user data addressed to the wireless terminal is existent, through the wireless transmitter;

the wireless terminal turns on the first power source and transmits an acquisition request frame for acquiring the user data through the terminal-side wireless transceiver when the notification frame is received through the wireless receiver; and the base station transmits the user data to the wireless terminal through the base-station-side wireless transceiver when the acquisition request frame is received through the base-station-side wireless transceiver.

* * * * *